April 30, 1963     G. AYROLDI     3,088,023

NON DAZZLING LIGHTS FOR MOTORCARS

Filed Dec. 6, 1960

INVENTOR
GIUSEPPE AYROLDI

BY Harold T. Stowell

ATTORNEY

United States Patent Office 3,088,023
Patented Apr. 30, 1963

3,088,023
NON DAZZLING LIGHTS FOR MOTORCARS
Giuseppe Ayroldi, Via Tirso 101, Rome, Italy
Filed Dec. 6, 1960, Ser. No. 74,189
Claims priority, application Italy Dec. 7, 1959
2 Claims. (Cl. 240—41.1)

This invention relates to improvements in headlights for motor vehicles.

Headlights, as they are presently installed in motor vehicles, have the serious shortcoming of either dazzling anyone facing the vehicle or illuminating insufficiently the road, when in the antidazzling position. Even when the headlights are in the anti-dazzling position, disturbance to the eyes of a person facing the light is not completely avoided.

The hereindescribed headlight has been contrived expressly to avoid the above defects.

Figure 1:
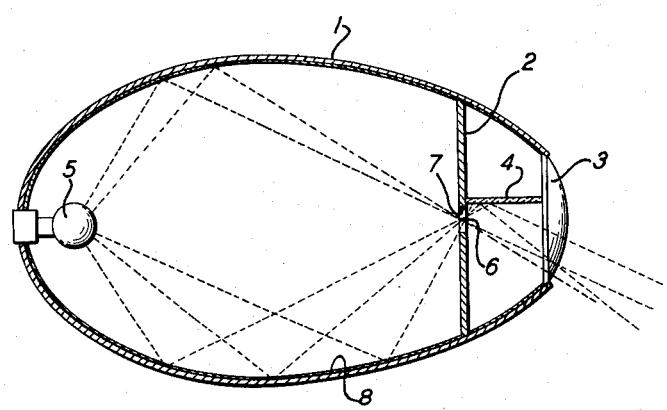
Figure 2:
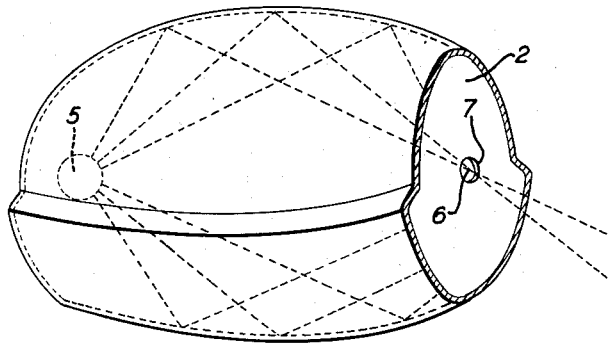

The invention will be more particularly described with reference to the drawings wherein:

FIG. 1 is a diagrammatic vertical sectional view of a headlight embodying the principles of the invention; and FIG. 2 is a perspective view in partial section of a modified form of the invention.

The principal structures of the headlight, as indicated for example in FIG. 1, but not necessarily limited thereto, are: 1 an ellipsoid-shape reflector, 2 a diaphragm, 3 a glass or lens, 4 a baffle, and 5 a source of light.

It is known that an ellipsoid has two finite focal points. Therefore, a single or double filament light source 5, when placed at one of the two focal points, emanates rays which, after having hit the inner surface of the ellipsoid, silver plated, as at 8 for practical reasons, reflect and converge to the other focal point.

By placing the diaphragm 2, having an aperture 7, at the height of the second focal point 6, all the extreme blaze is maintained within the reflector including the excessive light departing from the light bulb. The result is that someone facing the vehicle headlights will not be dazzled, and the above described shape of the reflector, cooperating with the apertured diaphragm provides the light beam for illuminating the road.

In order to eliminate any disturbing effect caused by the light beam passing through the aperture in the diaphragm a portion of the rays are reflected downwardly at a low angle. This is achieved by placing tangentially above the hole 6 of the diaphragm 2 a baffle 4 adequately shaped and silver-plated on its lower surface. In the illustrated form of the invention the baffle is flat and trapezoidal in shape.

It should be added that the deviated rays are not lost but directed by the baffle itself into the remaining light beam, thereby improving road illumination.

FIG. 2 illustrates another way of eliminating the disturbance caused by the light beam which comprises varying appropriately the shape of the lower part of the ellipsoidal surface on which the rays would be reflected into the eyes of someone looking into it. In this case, too, a proper contrivance would be employed to direct the deviated rays into the remaining light beam.

I claim:

1. An illuminating device comprising a wall, said wall having a generally ellipsoidal light reflecting inner surface including first and second spaced focal points on the major axis of the generally ellipsoidal inner surface, said ellipsoidal inner surface being truncated normal to the major axis thereof to include within the illuminating device said first and second focal points of the light reflecting surface, a source of light positioned on the major axis at the first focal point of the ellipsoidal surface remote from the truncated end, a first light impervious planar baffle, said light impervious planar baffle positioned with its plane surfaces parallel to the minor axis of the ellipsoidal inner surface and at the second focal point, an aperture in said first light impervious planar baffle, said aperture positioned at the second focal point of the ellipsoidal inner surface remote from the source of light, a second planar baffle supported by said illuminating device, a planar light reflecting surface on said second planar baffle, said light reflecting surface of the second baffle being positioned above the major axis of the ellipsoidal inner surface of the device and extending perpendicularly from the side of the light impervious baffle remote from the first and second focal points to reflect light passing through the aperture from the lower reflecting surface of the ellipsoidal inner surface and to direct said light into the beam of light passing through the aperture reflected from the upper reflecting surface of the ellipsoidal inner surface.

2. The illuminating device defined in claim 1 including a lens positioned in the path of the light passing through the aperture augmented by the beam of light reflected by the second baffle.

References Cited in the file of this patent

UNITED STATES PATENTS

| 1,818,875 | Wardwell | Aug. 11, 1931 |
| 1,835,745 | Barbian | Dec. 8, 1931 |
| 1,981,328 | Rivier | Nov. 20, 1934 |